April 11, 1967     I. S. HOUVENER ETAL     3,313,199
DOWEL
Original Filed March 6, 1964     6 Sheets-Sheet 1
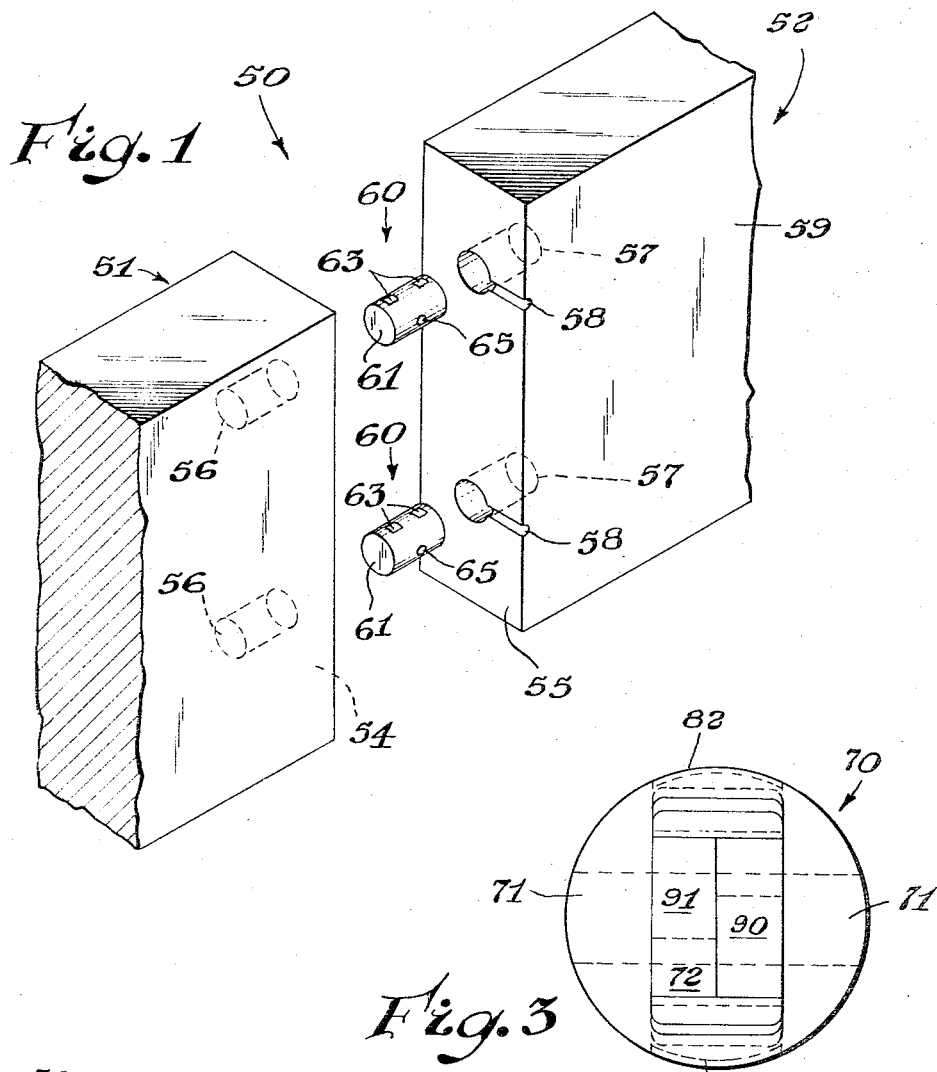
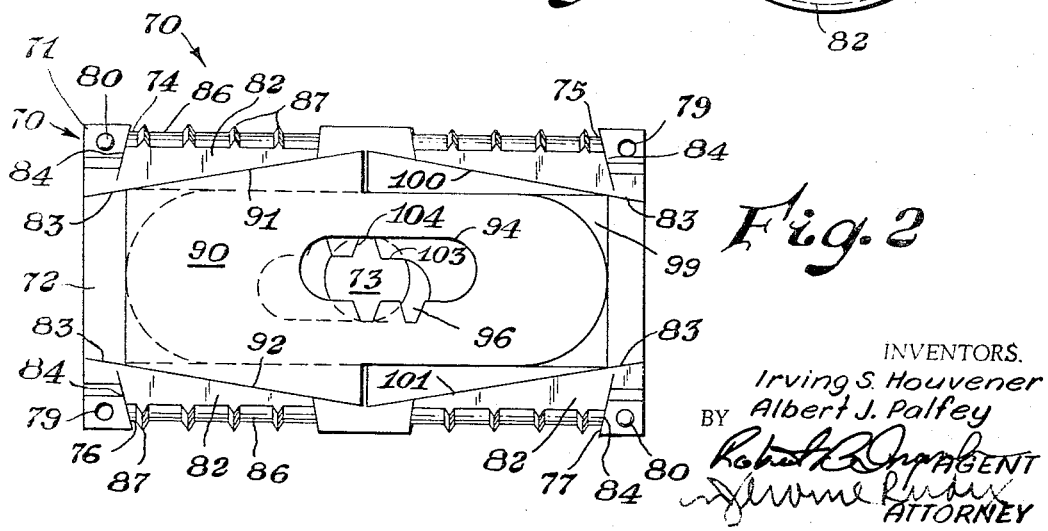
INVENTORS.
Irving S. Houvener
Albert J. Palfey
BY
AGENT
ATTORNEY April 11, 1967    I. S. HOUVENER ETAL    3,313,199

DOWEL

Original Filed March 6, 1964    6 Sheets-Sheet 2

INVENTORS.
Irving S. Houvener
Albert J. Palfey
BY
Robert E. Grant AGENT
Jerome Rudoix ATTORNEY

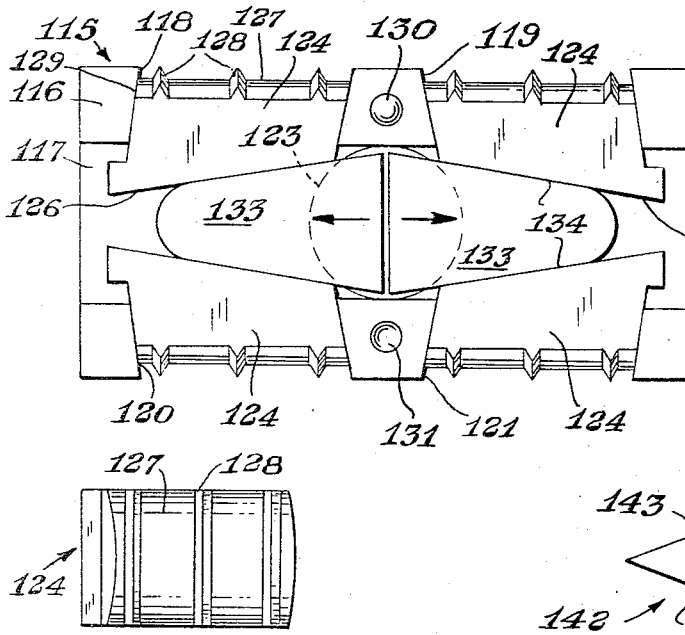
Fig. 14
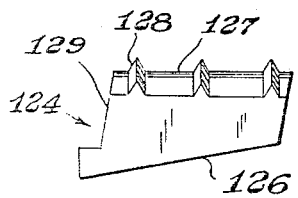
Fig. 15
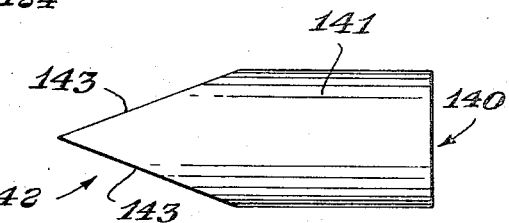
Fig. 20
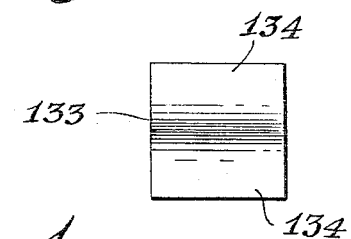
Fig. 16
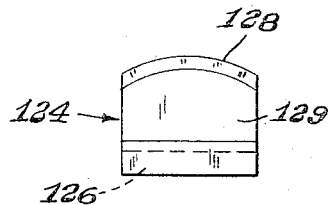
Fig. 17
Fig. 19
Fig. 18
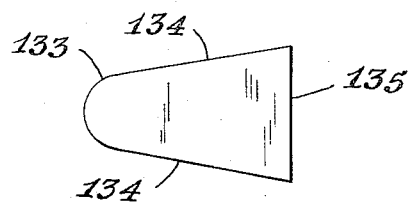
INVENTORS.
Irving S. Houvener
Albert J. Palfey
BY
ATTORNEY

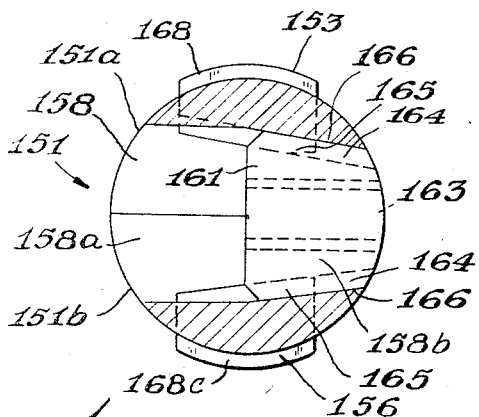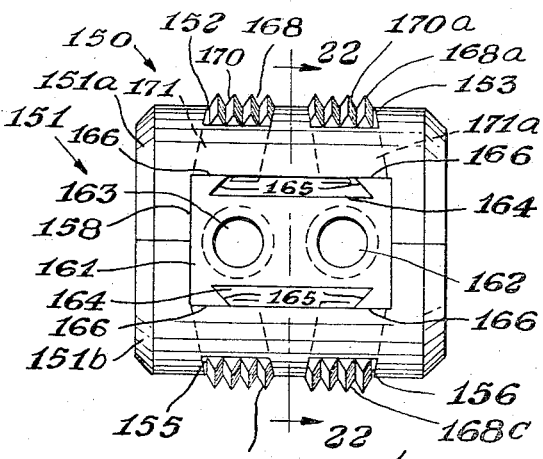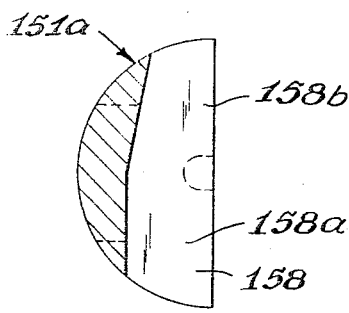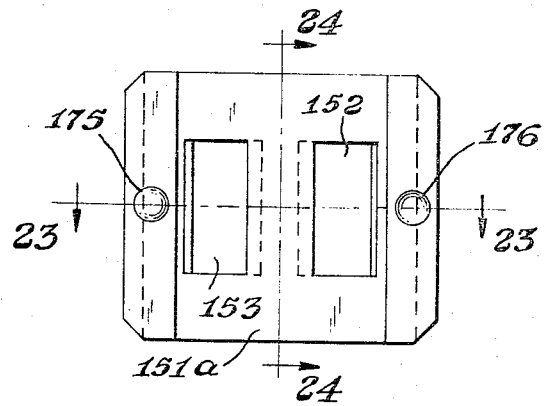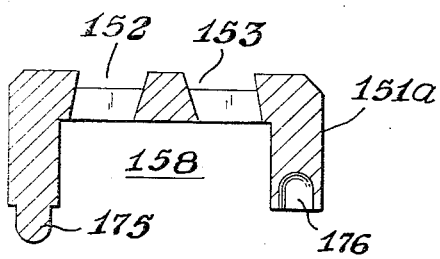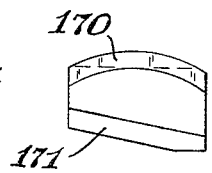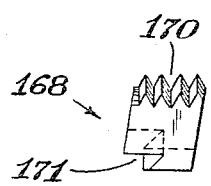

April 11, 1967   I. S. HOUVENER ETAL   3,313,199

DOWEL

Original Filed March 6, 1964   6 Sheets-Sheet 5

INVENTORS.
Irving S. Houvener
Albert J. Palfey
BY
AGENT
ATTORNEY

United States Patent Office 3,313,199
Patented Apr. 11, 1967

3,313,199
DOWEL
Irving S. Houvener, Houghton Lake, and Albert J. Palfey, Midland, Mich., assignors to The Dow Chemical Company, Midland, Mich., a corporation of Delaware
Original application Mar. 6, 1964, Ser. No. 349,914, now Patent No. 3,273,444. Divided and this application Mar. 4, 1966, Ser. No. 540,125
12 Claims. (Cl. 85—66)

This application is a divisional application of copending application Ser. No. 349,914, filed Mar. 6, 1964, now Patent No. 3,273,444.

This invention relates to dowels. It more particularly relates to radially expanding and longitudinally contracting dowels.

Many structures are fabricated from panels or other large sheet-like components of considerable thickness which desirably are joined together in edge to edge relationship. Oftentimes, considerable difficulty is encountered in securing such panels in a closely mating configuration in a convenient and easy manner. Generally, for maximum convenience in assembly, any fastener which is employed should be actuated from a location at the face of the panel rather than at the edge portions thereof.

It is an object of this invention to provide an improved dowel particularly suited for use in joining large objects.

Another object of this invention is to provide an improved dowel which is expandable in a direction generally normal to its longitudinal axis and in effect contracts in a direction parallel to its longitudinal axis.

A further object of this invention is to provide a dowel which may be tightened to engage oppositely disposed cavities and draw the bodies together which form or define the cavities.

These benefits and other advantages in accordance with the invention are readily achieved by providing a dowel; the dowel having a longitudinal axis and adapted to engage cavities formed in oppositely disposed bodies; the dowel comprising a housing; the housing defining a cavity therein and at least two tumblers disposed within the cavity of the dowel; means to alter the position of the tumblers to cause the tumblers to emerge from the body of the dowel, contact the wall of a cavity and provide a component of motion toward a plane generally normal to the longitudinal axis of the dowel and being disposed between opposite ends of the dowel; the dowel having means to position the tumblers and being actuated from a direction generally normal to the longitudinal axis of the dowel and from a location between the ends of the dowel.

Further features and advantages of the present invention will become more apparent from the following specification when taken in connection with the drawing wherein:

In FIGURE 1 there is schematically illustrated an exploded view of dowel pins of the invention joining panels in abutting relationship;

FIGURE 2 is a sectional plan view of a dowel in accordance with the invention;

FIGURE 3 is an end view of the dowel of FIGURE 2;

FIGURE 14 is a cross-sectional representation of an alternate embodiment of the invention;

FIGURES 15, 16, 17, 18 and 19 depict views of various components of the dowel of FIGURE 14;

FIGURE 20 depicts a view of the operating key for the dowel of FIGURE 14;

FIGURE 21 depicts an alternate embodiment of the invention;

FIGURE 22 is a sectional view of the dowel of FIGURE 20, whereas FIGURES 23, 24, 25, 26, 27, 28, 29, 30 and 31 show various views of the parts of the dowel of FIGURE 21;

Figure 4:
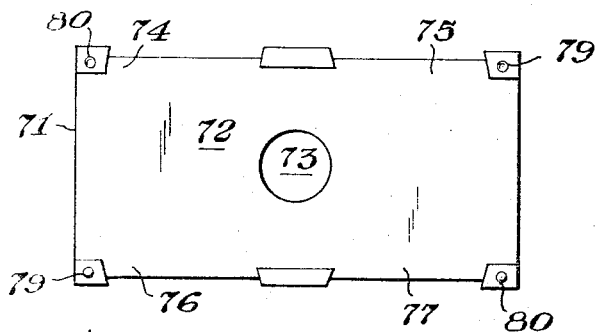
FIGURES 4, 5, 6, 7, 8, 9, 10, 11 and 12 are views of various components of the dowel of FIGURE 2.

In FIGURE 1 there is an exploded view of an assembly generally designated by the reference numeral 50. The assembly 50 comprises a panel 51 and a panel 52. The panel 51 has an edge face 54. The panel 52 has an edge face 55. Adjacent to and communicating with the face 54 are dowel receiving cavities 56. Within the face 55 of the panel 52 are like mating dowel receiving cavities 57. Generally adjacent the cavities 57 is a passageway 58 which provides communication between the major face 59 of the sheet 52 and the cavity 57. Coaxially disposed with relationship to the cavities 56 and 57 are dowels 60. The dowels 60 comprise body portions 61. A plurality of cavity engaging surfaces 63 are provided on the outer surface of the dowel body 61. An access means 65 is provided in the body 61 of the dowel 60 whereby the cavity engaging means 63 are retracted or extended from the body 61. The passageway 58 provides access to the opening 65 when the panels 51 and 52 are in abutting relationship. The dowels 60 in their closed position are positioned within cavities 56 and 57. A tool is then inserted within the passageway 58 and into the opening 65 which activates the cavity engaging means 63, securely fastening the dowel to the sheets 51 and 52.

In FIGURE 2 there is illustrated a view of a partially assembled dowel generally designated by the reference numeral 70. The dowel 70 comprises a case portion or housing 71. The case portion 71 defines an internal cavity 72 a generally radially disposed opening 73 providing means of access for an actuating mechanism. The housing 71 defines a plurality of generally radially disposed tumbler ports or passages 74, 75, 76, and 77 which are disposed adjacent the terminal portions of the tumbler body. The housing 71 is provided with pin receiving apertures 79 and pins 80. The apertures 79 and the pins 80 are adapted to mate with a similar housing 71 not shown. Disposed within the tumbler ports 74, 75, 76 and 77, are tumblers 82. Each of the tumblers 82 is provided with a camming surface 83 disposed generally centrally toward the aperture 73. A second tumbler camming surface 84 is provided which is adapted to engage a portion of the housing 71 defining the tumbler apertures. The camming surface 84 and the portion of the housing 71 defining the apertures is so constructed and arranged that motion of the tumblers 82 is in a generally radial direction but also has a component of motion toward a plane generally normal to the longitudinal axis of the pin. The tumblers 82 have an external cavity engaging surface 86 upon which are secured a plurality of teeth or projections 87 adapted to securely engage the internal surface of a cavity within which the dowel 70 is placed. Disposed within the cavity 72 is a tumbler pin 90. The tumbler pin 90 defines two generally opposed camming surfaces 91 and 92. Each of the camming surfaces 91 and 92 engages the oppositely disposed camming surfaces 83 of two of the tumbler pins 82. Within the body of the tumbler pin 90 is defined an elongated cavity 94. One of the longitudinal surfaces of the cavity 94 defines a rack 96. Adjacent to and in mating relationship with the tumbler pin 90 is a tumbler pin 99. The tumbler pin 99 is provided with the camming surfaces 100 and 101 which engage the camming surfaces 83 of the tumblers 82 remotely disposed from the camming surfaces 91 and 92 of the tumbler 90. Within the tumbler pin 99 is defined a cavity or opening 103 having defined on one of the longitudinal surfaces thereof a rack 104.

FIGURE 3 depicts an end view of the dowel 70 of FIGURE 1, wherein both housing portions 71 are illustrated and the tumbler pins 90 and 99 are depicted. The dotted lines illustrate the positioning of the tumblers 82 and the cavity 72.

FIGURE 4 depicts a view of the housing portion 71 with the tumblers 82 and the tumbler pins 90 and 99 removed.

Figure 5:
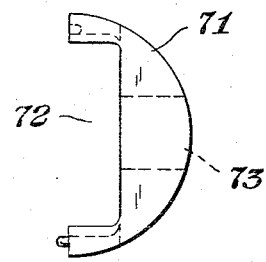

FIGURE 5 illustrates an end view of the housing 71 more clearly illustrating the relationship of the pins 79, cavity 80 and the cavity 72.

Figure 6:
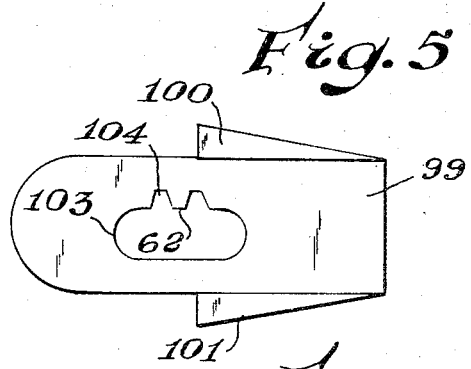

FIGURE 6 is a plan view of a tumbler pin 99 depicting the relationship of the camming surfaces 100, 101, the aperture 103 having the rack 104 defined on one of the longitudinal surfaces defining the aperture 103.

Figure 7:
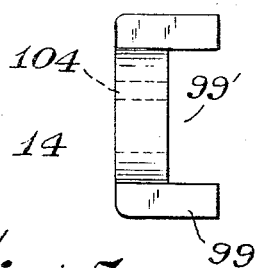

FIGURE 7 depicts an end view of the tumbler pin 99 illustrating a cavity or recess 99′ adapted to receive a portion of the tumbler pin 90.

Figure 9:
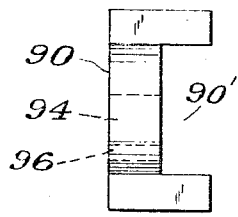
Figure 8:
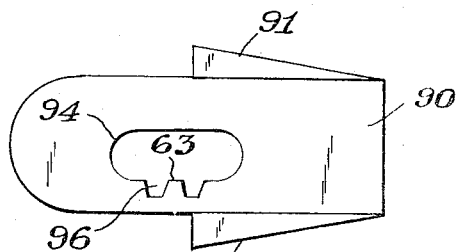

FIGURES 8 and 9 depict the tumbler pin 90 and the camming surfaces 91 and 92, the elongated aperture 94 having a rack 96 defined by one of its generally elongated surfaces. The tumbler pin 90 defines a recess 90′ adapted to engage a portion of the tumbler pin 99 when the tumbler pins are positioned in the manner illustrated in FIGURE 2.

Figure 10:
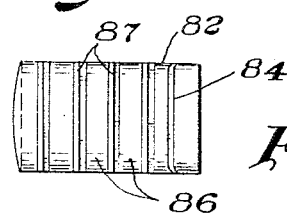
Figure 11:
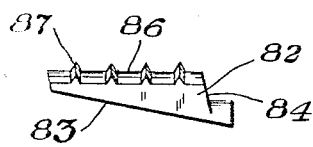
Figure 12:
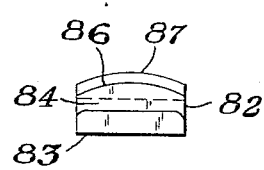

FIGURES 10, 11 and 12 depict three views of a tumbler 8. The tumbler 82 has an inner camming surface 83. The terminal camming surface 84 which is adapted to engage the portion of the body defining the apertures 74, 75, 76 or 77 of the body 71 is disposed in angular relationship to the surface 86 which has disposed thereon the teeth projections or cavity engaging means 87.

Figure 13:
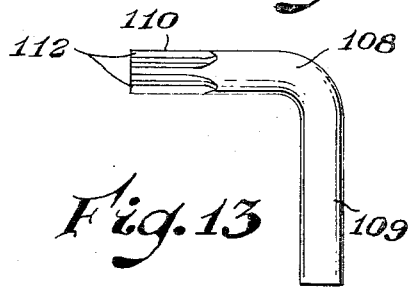
FIGURE 13 is a view of an operating lever for the dowel of FIGURE 2.

FIGURE 13 depicts a view of a wrench or key 108. The key provides a handle portion 109 and an operating portion 110. The operating portion 110 is provided with a plurality of teeth 112 adapted to mate with the racks 96 and 104.

In operation the dowel pin 70 in assembled form is positioned in a manner similar to the dowel 60 of FIGURE 1 and placed within the cavities formed within the members to be joined. The dowel 70 must have its internal mechanism positioned in the manner such as is illustrated in FIGURE 2 wherein the tumbler pins 90 and 99 are retracted to form the shortest combined length. Thus, the camming surfaces 91, 92, 100 and 101 permit the tumblers 82 to be retracted within the body when the dowel 70 is positioned within the cavity and operating means such as the tool or wrench 108 of FIGURE 13 is inserted into the opening 73. The teeth 112 of the wrench engaging the rack portions 104 and 96 of the tumblers 99 and 90 respectively and on rotation in a counter clockwise direction force the tumbler pins toward opposite ends of the housing, thereby causing the camming surfaces 91, 92, 100 and 101 to forceably engage the camming surfaces 83 of the tumblers 82. This action results in the moving of the tumblers 82 in a generally radially outward direction from the body of the dowel 70. However, the configuration of the apertures 74, 75, 76 and 77 in contact with the adjacent camming surfaces 84 of the tumbler 82 causes the tumbler to be moved toward a plane passing through the longitudinal axis of the dowel. As the tumblers 82 emerge from the body of the dowel 70 the camming surfaces 84 force the tumblers toward a central plane generally normal to the longitudinal axis of the dowel. As these tumblers engage the walls of the cavities in which they are being installed the members defining these cavities are firmly secured thereto and forced together.

FIGURE 14 depicts an alternate dowel in accordance with the invention generally designated by the reference numeral 115. The dowel 115 comprises two body portions 116 (one removed for clarity). The two body portions 116 are adapted to mate together to form a generally cylindrical body as the portions 71 of FIGURE 2. Within the housing portions 116 is defined a cavity 117 having generally radially disposed openings 118, 119, 120 and 121. Each body portion 116 defines a radially disposed operating aperture 123. Disposed within the apertures 118, 119, 120 and 121 are tumblers 124, each of the tumblers 124 has a camming surface 126 oppositely disposed to a cavity engaging surface 127 having thereon a plurality of projections 128. Generally adjacent to the cavity engaging surface 127 is a camming surface 129 adapted to engage a body portion 116. The body portion 116 is provided with a projecting pin 130 and a cavity 131. When two body portions 116 are placed in face to face relationship the pin 130 engages the aperture 131 and maintains the body portions in fixed relationship to each other. Tumbler pins 133 are disposed within the cavity 117. Each of the tumbler pins is provided with camming surfaces 134 adapted to engage the camming surfaces 126 of the tumblers 124. The construction of the tumbler pins 124 is more apparent from the FIGURES 15, 16 and 17 wherein the relationship of the camming surfaces 126 and 129 and the cavity engaging surface 127 having the projections 128 is shown in detail unencumbered by any associated parts.

FIGURES 18 and 19 provide two views of the tumbler pin 133 which are provided with two camming surfaces 134 to engage the surfaces 126 of the tumblers 124. The tumbler pins 133 have also a key engaging surface 135.

FIGURE 20 depicts a view of a key 140 comprising a cylindrical body portion 141 defining the wedge shaped terminal end portion 142 and the wedge shaped end portion 142 defines two camming surfaces 143.

In operation of the embodiment of the invention depicted in FIGURES 14–20, the dowel is assembled in substantially the same manner as the dowel of FIGURE 2 and the tumblers are forced outwardly from the body of the dowel 115 by insertion of the key 140 through the aperture 131 into the space between the two tumbler pins 133. As the key is advanced into the dowel the tumbler pins 133 move in the direction of the arrows causing the tumblers to move in a manner substantially similar to that of the embodiment of FIGURE 2.

In FIGURE 21 there is illustrated a plan view of a dowel 150 in accordance with the present invention. The dowel 150 comprises a case or housing 151. The case or housing comprises a case portion 151A and a second case portion 151B. The case portion 151A and 151B are in mirror image realtionship to one another. The case portion 151A defines passageways 152 and 153. The passageways 152 and 153 converge in a direction generally normal to the longitudinal axis of the dowel and on the same side of the longitudinal axis as the passageways lie. Similarly, the housing portion 151B defines similar passageways 155 and 156. A passageway 158 is defined by the housing portions 151A and 151B. The passageway 158 extends from one side of the dowel to the other.

In FIGURE 22 the configuration of the passageway 158 is depicted. The passageway 158 is divided into a generally parallel walled portion 158A and a tapering walled portion 158B. Within the passageway 158 is disposed a tumbler pin 161. The tumbler pin defines two centrally disposed threaded passageways 162 and 163. The tumbler pin 161 defines a pair of opposed dovetail grooves 164. The grooves 164 have inwardly disposed camming surfaces 165. Immediately adjacent the camming surfaces 165 is a camming surface 166. Disposed within the apertures 152 is a tumbler 168. The tumbler 168 is provided with an exterior cavity engaging surface 170 and with a mating dovetail groove 171 adapted to engage one set of the camming surfaces 165 and 166 of the tumbler pin 161. Within the passageway 153 is disposed a tumbler pin 168A. The tumbler pin 168A has a cavity engaging surface 170A and an oppositely disposed groove 171A adapted to engage the camming surfaces 165 and 166 of the tumbler pin 161. Generally similar tumblers 168B and 168C are disposed in the apertures 165 and 166 respectively of the body portion 161B.

FIGURE 23 is a longitudinal sectional view of the body portion 151A illustrating the passageway 158 and the apertures or passageways 152 and 153. The body portion 151A is provided with a locating pin 175 and an oppositely disposed cavity 176. The pin 175 is adapted to mate with a corresponding aperture disposed in the body portion 151B and the cavity 176 is adapted to mate with a pin oppositely disposed on the body portion 151B.

FIGURE 24 is a sectional view of the body portion 151A wherein the configuration of the passageway 158 is clearly evident.

FIGURE 25 is a bottom view of the case portion 151A more clearly illustrating the positioning and direction of the apertures 152 and 153.

FIGURES 26 and 27 depict two views of the tumbler 168 illustrating the relationship between the cavity engaging surface 170 and the groove 171.

Figure 28:
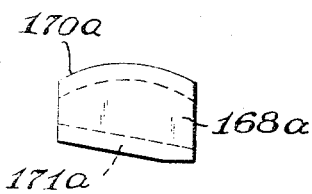
Figure 29:
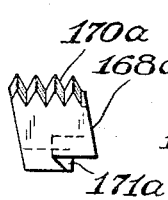

A mirror image tumbler 168 is shown in FIGURES 28 and 29. The tumblers 168 and 168A have a mirror image symmetry about a plane running vertically and at right angles to the plane of the paper. The remaining tumblers 158B and 168C have mirror image symmetry with the tumblers 168 and 168A wherein the plane of symmetry is horizontally disposed and at right angles to the plane of the paper.

Figure 30:
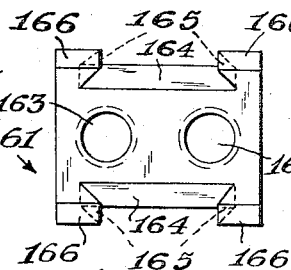
Figure 31:
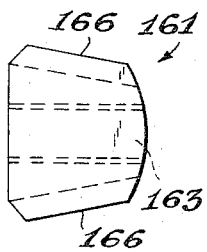

FIGURES 30 and 31 depict a front view and side view of the tumbler pin 161 and serves to illustrate the relationship between the camming surfaces 165 and 166 and the groove or channels 164.

The dowel 150 illustrated in FIGURES 21–31 operates in a manner substantially similar to the dowel 115 and the dowel 70. The dowel is installed in a manner substantially similar to that illustrated in FIGURE 1. A screw or bolt is positioned in either or both of the threaded apertures 162 and 163 of the tumbler pin 161 and the tumbler pin positioned in such a manner that the tumblers 168, 168A, 168B and 168C lie wholly within the body 151. Rotation of a screw or bolt within the threaded aperture of the tumbler pin in such a manner as to force the tumbler pin into the portion 158B of the passageway 158 causes the tumblers to be forced from the body of the dowel and engage the inner walls of the cavity in which it has been installed. The motion of the tumblers 168, 168A, 168B and 168C serves to securely lock the dowel within and force the adjacent panels together.

Figure 33:
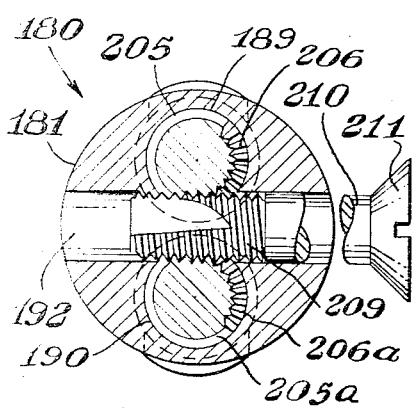
FIGURE 33 is a sectional view along the line 2—2 of FIGURE 32.
Figure 32:
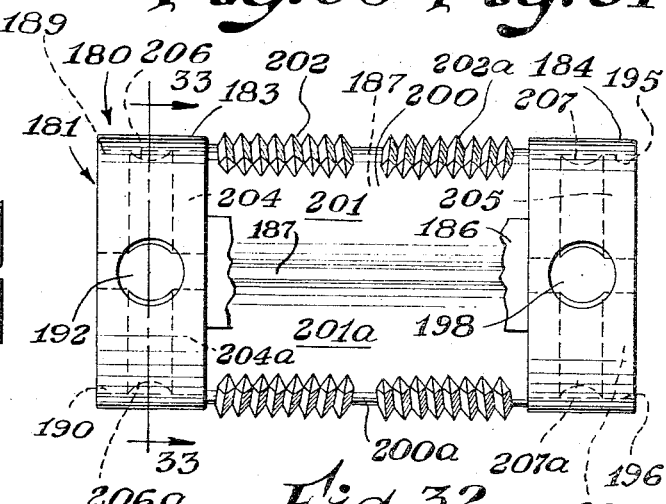
FIGURE 32 is a plan view of an alternate dowel.

FIGURES 32 and 33 illustrate a dowel generally designated by the reference numeral 180. The dowel 180 comprises a housing 181. The housing 181 comprises an end bearing plate 183 and an oppositely disposed end bearing plate 184 having rigid braces 186 and 187 disposed therebetween. The bearing plate 183 defines a bearing 189 and a bearing 190. An aperture 192 extends diametrically through the bearing plate 183 and communicates with the bearing aperture or the bearings 189 and 190. The oppositely disposed end bearing 184 similarly defines bearing cavities 195, 196 and the radial cavity 198 communicating with the cavities 195 and 196. Supported by the bearings 189 and 195 is a tumbler 200. The tumbler 200 comprises a body portion 201 having thereon a cavity, a raised eccentrically disposed cavity engaging surfaces 202 and 202A. The surfaces 202 and 202A are in the form of helical thread portions disposed about a portion of the generally cylindrical body portion 201. The body 201 is terminated on one end by the adjacent bearing surface 204, having disposed therein a worm gear portion 206 which is in communication with the passageway 192 of the end bearing 181. Similarly disposed within the bearing surface 205 of the tumbler 200 is a second worm gear portion 207 which is adjacent the passageway 198. A second tumbler 200A is provided generally oppositely disposed to the tumbler 200. The tumbler 200A has a body portion 201A, bearing surfaces 204A and 205A and worm gear portions 206A and 207A disposed adjacent the bearing surfaces 204A and 205A, respectively.

In FIGURE 33 there is illustrated a worm 209 in engagement with the worm gear portions 205 and 205A. The worm 209 includes a shaft portion 210 having a rotating and retaining means 211 rigidly affixed thereto.

Figure 34:
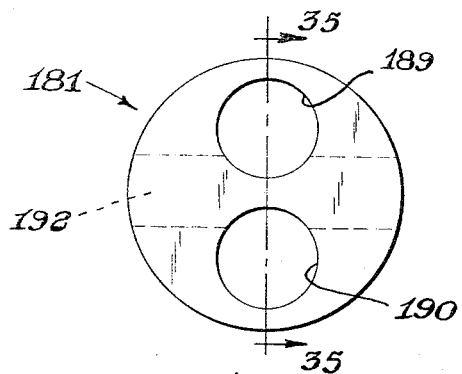
FIGURES 34, 35, 36 and 37 depict views of various components of the dowel of FIGURE 32.
Figure 35:
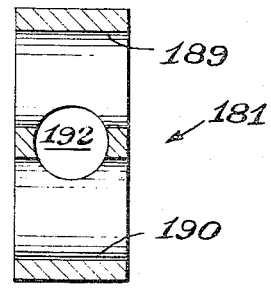

FIGURES 34 and 35 show a detailed view of the end bearing 181 showing the location of the bearings 189 and 190 as well as the configuration of the passageway 192.

Figure 36:
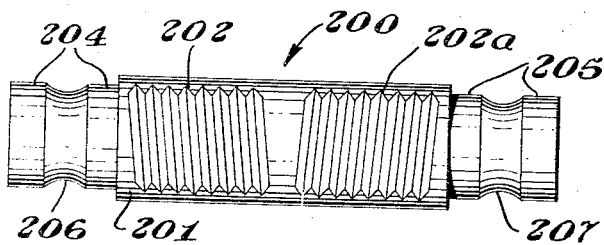
Figure 37:
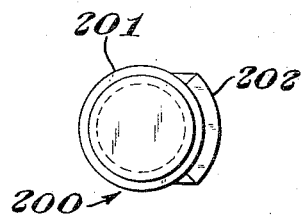

FIGURES 36 and 37 depict detailed views of the tumbler 200 removed from the dowel 180 showing the location of the bearing surfaces 204, 205, the worm gear portions 206 and 207.

Figure 38:
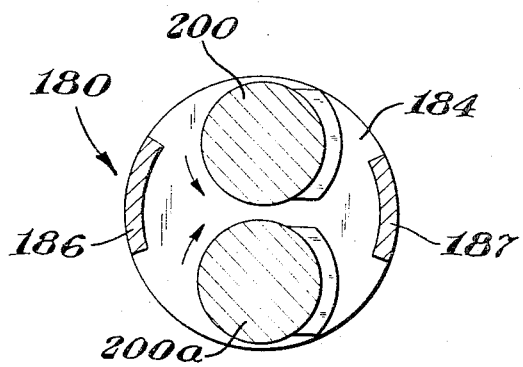
FIGURE 38 is a schematic sectional view of the dowel of FIGURE 32 in the unlocked position.

FIGURE 38 depicts the relationship of the tumblers 200 and 200A as observed from a cross-sectional view of the dowel 180 when the dowel is in the disengaged position. Operation of the embodiment of FIGURES 32–38 is generally similar to the previously described embodiments with the exception that almost entirely rotary motion is employed. A dowel 180 as installed in a location such as depicted in FIGURE 10 is first adjusted so that the tumblers are positioned as illustrated in FIGURE 38, that is, they are rotated in such a fashion that the cavity engaging surfaces 202, 202A and the matching surfaces on the tumbler 200A are within the general outline of the dowel body. The dowel is then installed and one or two worms such as the worm 209 is inserted through an aperture in the panel adapted to mate generally with the apertures 192 and 198. On rotation of the worms in a suitable direction all cavity engaging surfaces engage the internal surface of the cavity and due to their threadlike configuration draw the members being joined tightly together. Advantageously the thread design of the worms 206, 206A, 207 and 207A can be such that a standard machine screw or other readily available threaded member may be utilized as the worm.

The various embodiments of dowels in accordance with the present invention are each found to have benefits and advantages for certain applications. For example, illustrated in FIGURE 2 is an embodiment particularly advantageous for joining members which are not subject to severe vibration and which require frequent assembly, disassembly or change. A short single motion of the key will serve to unlock or lock a dowel of this type. The embodiment as illustrated in FIGURE 14 is particularly suitable where a relatively large force is required in firmly locking the tumblers to the internal wall of the cavity. This is provided by the tapered key 141 which separates the tumbler pins 133 from each other. Further this embodiment wherein a solid headless pin is used permits permanent assembly under conditions subjected to vibration which oftentimes tend to dislodge the tumbler pins of the embodiment of FIGURE 2. The embodiment illustrated in FIGURES 21 and 22 is particularly useful for applications wherein the members to be joined require a controllable pressure exerted on the tumblers and this is accomplished by providing a screw takeup on the tumbler pin 161. Thus, they are readily and adjustably tensioned in such a manner that if tensional forces are applied to the assembly and the degree of engagement can be made such that the dowel will pull out of the cavity in one of the members being joined rather than rupturing or doing other severe damage thereto. The embodiment of the invention illustrated in FIGURES 32–38 is particularly advantageous for applications subject to extreme vibration. Also extremely high force can be applied to the members being joined by means of the compound screw action obtained through the action of the worm and its associated worm gears. In extreme cases two worms are utilized to obtain maximum force. Beneficially this embodiment of the invention is readily assembled from the component parts as the stiffening frame members 186 and 187 may be omitted and the dowel 180 assembled from like plates and the tumblers 200 and 200A in the cavity of one of the members to be joined and subsequently secured there by the insertion of the worm.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A dowel comprising a generally cylindrical body having a longitudinal axis, the body defining an internal space, at least two tumbler receiving recesses disposed at opposite ends of the body, a tumbler disposed within each of the tumbler receiving recesses, the tumblers having a surface adapted to engage a cavity wall, at least a pair of tumbler pins, each of said tumbler pins having a camming surface adapted to engage a face of the tumbler generally opposite the cavity engaging face, the tumbler pins being slidably positioned within the cavity, means to move the tumbler pins within the cavity thereby extending and retracting the tumbler pins in a radially outward direction and in a direction toward the central portion of the body, the tumbler pins defining a longitudinal slot, the tumbler pins are adapted to be positioned in overlapping relationship with at least a portion of the longitudinal slots being generally coextensive, each of the slots having a longitudinal edge defining a rack and the racks of the slots being disposed oppositely from one another.

2. The dowel of claim 1 wherein the body portion is comprised of two parts and each end portion of the dowel is provided with two generally radially opposed tumblers.

3. A dowel comprising a generally cylindrical body, said body having an interior longitudinal passageway and a centrally disposed radial passageway, at least one tumbler receiving passageway disposed at opposite ends of the dowel and extending in a generally radial direction, radially outward from the body toward a centrally disposed plane generally normal to the longitudinal axis of the dowel and the passageways being projectable to intercept the plane at a location external to the dowel body, a tumbler disposed within each of the passageways, each of the tumbler pins having the form of a wedge, the tumbler pins and tumblers so constructed and arranged that the tumblers are forced outwardly from the body as the tumbler pins are forced apart in a generally axial direction with respect to the body, a key comprising a wedge adapted to be placed between the tumbler pins and force them apart along the longitudinal axis of the body.

4. The dowel of claim 3 wherein at least four tumblers are provided.

5. The dowel of claim 3, wherein each of the tumblers is provided with at least one ridge adapted to be forced into the wall of the cavity.

6. A dowel comprising a body having a longitudinal axis, the dowel defining an internal diametrically disposed passageway, the housing defining at least two radially extending tumbler passageways, the tumbler passageways extending in a radial direction generally normal to the direction of the diametric passageway, the tumbler passageways if extended beyond the body intersecting a plane generally normal to the longitudinal axis of the body, within each of the tumbler passageways a tumbler, the tumblers when flush with the exterior surface of the body extending into the diametrical passageway, a tumbler pin adapted to slide in a generally radial direction within the diametrical passageway and adapted to engage the tumbler and force a surface of the tumbler beyond the body portion and engage a cavity wall, the tumbler pin having a wedge shaped configuration.

7. The dowel of claim 6 having four tumblers and four tumbler passageways.

8. The dowel of the claim 6 wherein the tumbler pin is provided with at least one internally threaded aperture so positioned as to provide a means of forcing the tumbler pin through the diametrically disposed passageway.

9. A dowel comprising at least one rotatable tumbler, the tumbler having a cavity engaging surfaces comprising interrupted threaded of opposite hand, threads of each hand being disposed adjacent opposite ends of the tumbler, a worm gear disposed on said tumbler, a tumbler supporting means, the tumbler supporting means having defined therein means to receive at least a portion of the tumbler and rotatably supported at a location generally adjacent the worm gear, a worm rotatably supported by the tumbler support, the worm being in operative engagement with the worm gear and so constructed and arranged so as to rotate the tumbler pin and position the interrupted threads in a cavity engaging position or in a noncavity engaging position at will.

10. The dowel of claim 9 having two radially opposed tumblers operating from a common worm.

11. The dowel of claim 9 having a pair of radially opposed tumblers, each of the tumblers provided with a worm gear at each end thereof.

12. The dowel of claim 9 wherein said worm is a screw.

References Cited by the Examiner

UNITED STATES PATENTS

| 1,236,538 | 8/1917 | Brown | 85—67 |
| 1,288,786 | 12/1918 | Wilschewski | 85—67 |
| 1,459,542 | 6/1923 | McCathron | 85—67 |
| 2,192,048 | 2/1940 | Mueller | 287—127 |
| 2,214,177 | 9/1940 | Raybould | 287—127 |

FOREIGN PATENTS

| 553,147 | 5/1943 | Great Britain. |

CARL W. TOMLIN, *Primary Examiner.*

M. PARSONS, JR., *Examiner.*